United States Patent [19]

Mills

[11] 4,076,934

[45] Feb. 28, 1978

[54] METHOD FOR CONTROLLING OXYGEN LEVEL DURING CONTINUOUS XANTHATION OF ALKALI CELLULOSE

[75] Inventor: Gordon D. Mills, Veedersburg, Ind.

[73] Assignee: Olin Corporation, Pisgah Forest, N.C.

[21] Appl. No.: 734,826

[22] Filed: Oct. 22, 1976

[51] Int. Cl.$^2$ .................................................. C08B 9/04
[52] U.S. Cl. .................................. 536/60; 23/252 R; 366/101
[58] Field of Search ...................... 536/60, 61; 23/252, 23/290; 259/4

[56] References Cited

U.S. PATENT DOCUMENTS

| | | | |
|---|---|---|---|
| 520,770 | 6/1894 | Cross et al. | 536/60 |
| 1,842,688 | 1/1932 | Richter | 536/60 |
| 2,117,038 | 5/1938 | Richter | 536/60 |
| 2,122,519 | 7/1938 | Dokkum | 536/61 |
| 2,139,302 | 12/1938 | Booys | 536/60 |
| 2,530,403 | 11/1950 | Seaman | 536/60 |
| 2,744,292 | 5/1956 | Schlosser et al. | 536/60 |
| 2,985,647 | 5/1961 | Kokorn | 536/60 |
| 3,438,969 | 4/1969 | Meister | 536/60 |

*Primary Examiner*—Ronald W. Griffin
*Attorney, Agent, or Firm*—Robert W. Habel

[57] ABSTRACT

The amount of oxygen present during the continuous xanthation of alkali cellulose with carbon disulfide is narrowly controlled by continuously purging the alkali cellulose with nitrogen prior to entry of the alkali cellulose into the xanthator. Preferably, the nitrogen is metered into the alkali cellulose near the bottom of the feeder hopper before being fed into the xanthator, thereby allowing air entrained therein to be displaced by the nitrogen as it transfuses through the alkali cellulose.

1 Claim, 1 Drawing Figure

METHOD FOR CONTROLLING OXYGEN LEVEL DURING CONTINUOUS XANTHATION OF ALKALI CELLULOSE

BACKGROUND OF THE INVENTION

This invention relates generally to the continuous xanthation of alkali cellulose and more particularly to a method for controlling the oxygen level in the reaction vessel during the continuous xanthation of alkali cellulose.

Preparation of viscose for use in the manufacture of regenerated cellulose films involves a series of steps. One step in its manufacture is xanthation, wherein ripened alkali cellulose is converted into caustic soluble xanthate by treating it with carbon disulfide. In the continuous process, a closed reaction vessel is used to which the alkali cellulose is passed for continuous conversion to cellulose xanthate. The operating procedure requires the continuous feeding of alkali cellulose onto several transporting means such as two continuous belts located inside the reaction vessel. As the alkali cellulose is discharged into the vessel from the feeder onto the upper belt, it is wetted with a spray of carbon disulfide and carried the length of the xanthator vessel where it is discharged to the lower belt and returned the opposite direction for the length of the vessel. During the period of time the alkali cellulose is on the moving conveyor belts, the xanthation reaction proceeds. The cellulose xanthate is then discharged from the bottom belt into a paddle mixer to which a continuous stream of caustic and water is added forming concentrated viscose slurry which is thereafter continuously removed from the reaction vessel.

A temperature of approximately 25°–35° C is maintained during the reaction and the atmosphere within the xanthator reaction vessel is maintained to contain from about 25–35% carbon disulfide and about 65–75% nitrogen. Oxygen is also present in this atmosphere being carried into the unit with the air entrapped in the alkali cellulose. An oxygen level above 5% produces a dangerous atmosphere which is potentially explosive, and, in order to maintain a safe operation, the vessel is continually purged with nitrogen to reduce the oxygen level to safe limits. In the prior art methods, control of oxygen is accomplished by metering nitrogen directly into the xanthator vessel at one or more places in the tank. This method of oxygen control is satisfactory when operating speeds and alkali cellulose throughput rates are low. However, where greater production is required, excessive amounts of nitrogen must be metered into the unit to maintain an oxygen level below 5% since high throughput rates contribute to an increased oxygen level in the vessel because of the greater amounts of air being carried into the vessel with the alkali cellulose. A typical apparatus and method of the above described type is disclosed in U.S. Pat. No. 2,174,056. Such method and apparatus are effective for continuous xanthation where low throughput rates are used. However, the method is unsatisfactory where higher amounts of cellulose crumbs are introduced into the vessel if faster throughput rates are to be achieved without reaching a dangerously high level of oxygen in the atmosphere within the vessel.

SUMMARY OF THE INVENTION

Accordingly, it is an object of this invention to provide a method for conveniently and economically limiting the amount of oxygen present in the reaction vessel atmosphere during the continuous xanthation of alkali cellulose with carbon disulfide. Another object of this invention is to provide a method for maintaining the amount of oxygen present in the reaction vessel atmosphere at safe limits that permits the continuous xanthation of alkali cellulose with carbon disulfide at high throughput rates.

Surprisingly, we have discovered that the oxygen level in the reaction vessel during the continuous xanthation of alkali cellulose can be conveniently and economically controlled while permitting high throughput rates by continuously purging the alkali cellulose with nitrogen before it enters the reaction vessel. In the preferred method, the nitrogen is metered into the alkali cellulose crumbs near the bottom of the hopper feeder prior to feeding the crumbs into the reaction vessel. Typical feeders are of the screw conveyor type in which a helical screw operates to continuously move the alkali cellulose crumbs vertically downwardly into the reaction vessel while maintaining a seal between the vessel atmosphere and the external atmosphere. A cone shaped hopper enclosure is mounted above the screw conveyor and acts as a holding area for the alkali cellulose before it is fed to the reaction chamber. In accordance with the invention, by purging the alkali cellulose crumbs with nitrogen in the hopper before the crumbs enter to reaction chamber the nitrogen displaces entrapped air allowing the alkali cellulose to enter the reaction vessel essentially free of oxygen. Since nitrogen is lighter than air, it continually displaces and drives off the entrapped air in the alkali cellulose before the material reaches the reaction vessel. It has also been discovered that this system is sufficient to control the oxygen level in the reaction vessel such that the practice of metering nitrogen directly into the reaction vessel to control the oxygen level can be eliminated. Furthermore, since the alkali cellulose entering the reaction vessel is essentially free of entrapped oxygen, the throughput rate for the system can be substantially increased up to the reaction limitations of the continuous xanthation unit. Thus, in accordance with the invention, throughput rates are not limited because of excessive oxygen entering the reaction vessel via the alkali cellulose and they may be increased to any level consistent with the operation of the overall process while still maintaining a safe atmosphere within the reaction vessel.

BRIEF DESCRIPTION OF THE DRAWING

In order that the invention may be more readily understood and carried into effect, reference is made to the accompanying drawing which is offered by way of example only and not in limitation of the invention, the scope of which is defined by the appended claims rather than by the description preceding them.

In the drawing.

DETAILED DESCRIPTION OF THE INVENTION

Figure 1:
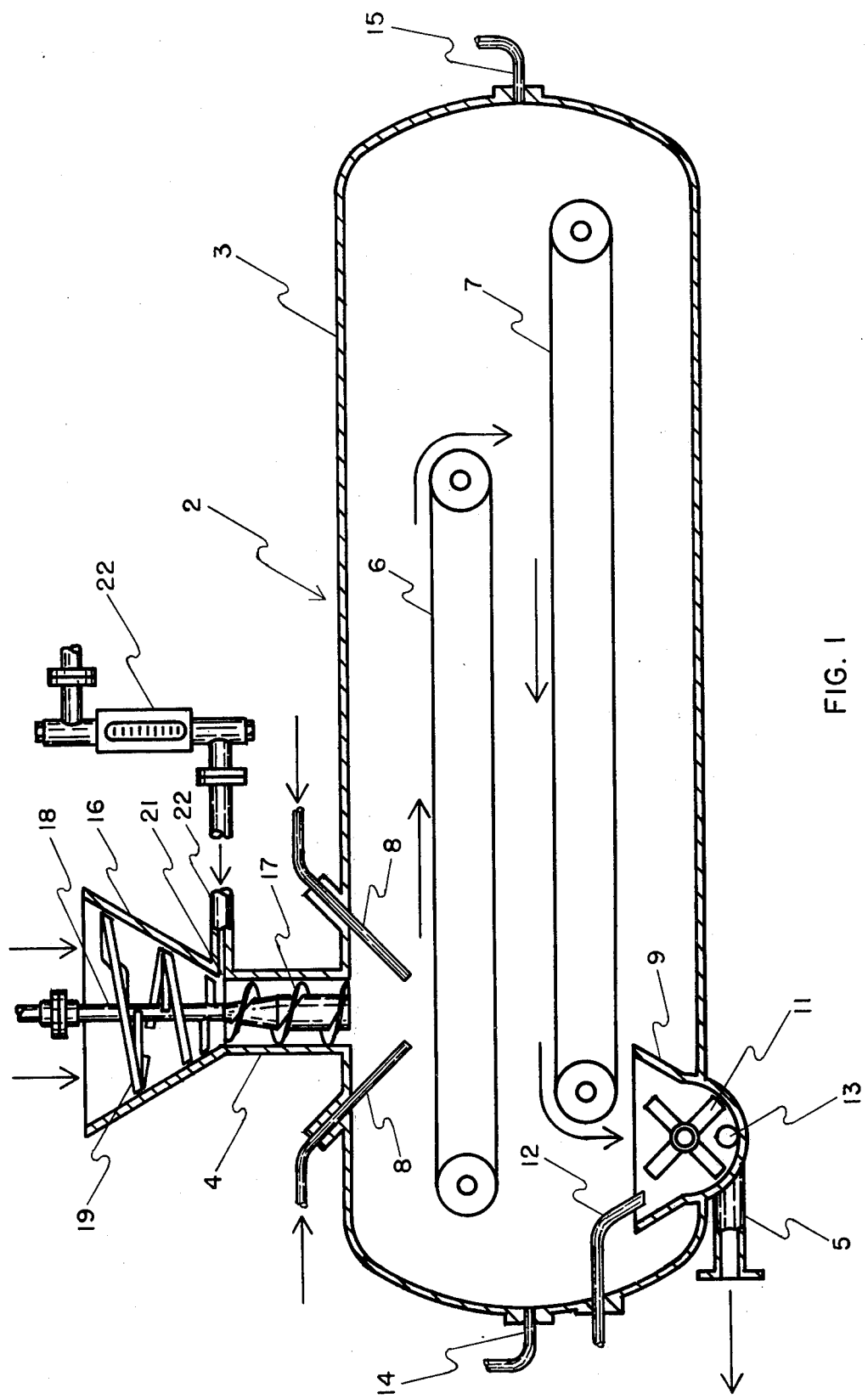
FIG. 1 is a longitudinal section of the reaction vessel showing the hopper screw conveyor and basic element of the system in schematic illustration.

As shown in FIG. 1, the invention is embodied in the continuous xanthation apparatus generally designated 2, comprising a closed reaction vessel 3, provided with an inlet duct 4 for introducing alkali cellulose crumbs into the xanthating vessel and an outlet 5 for removal of converted cellulose xanthate from the bottom after it is dissolved in an aqueous caustic solution. Within the vessel 3 are provided several endless moving conveyor belts 6 and 7 driven in opposite directions by any conventional means (not shown) and arranged one above the other in staggered relationship. Alkali cellulose enters the vessel through inlet duct 4 and is continuously deposited on conveyor belt 6 where it is sprayed with carbon disulfide pumped from a plurality of spray jets 8 which are positioned to discharge inside the vessel above belt 6. After contact with carbon disulfide, the alkali cellulose is carried by conveyor belt 6 the length of the vessel 3 from which it is discharged onto conveyor belt 7 and carried through the vessel in the opposite direction. During the period of time the material is on the moving conveyor belts, the xanthation reaction proceeds between the carbon disulfide and alkali cellulose resulting in cellulose xanthate which is discharged from the end of conveyor belt 7 into trough 9 containing paddle mixer 11 in the bottom of vessel 3. A continuous stream of aqueous sodium hydroxide is added to the cellulose xanthate in trough 9 through nozzle 12 and the two blended by paddle mixer 11 to produce a concentrated viscose slurry which is continuously removed from trough 9 through port 13 and outlet 5 by a transfer pump (not shown) for use in the manufacture of regenerated cellulose articles. Vents 14 and 15 in opposite ends of vessel 3 are provided to initially displace all the air within the chamber with nitrogen and maintain the pressure within the vessel constant through interconnection with a regulating system (not shown) for removing or adding small amounts of the gaseous mixture within the vessel should this become necessary. The temperature within the vessel is about 25°-35° C and preferably about 28° C during xanthation.

In accordance with the invention, there is mounted above inlet duct 4 a funnel shaped hopper 16 which provides a holding area for the alkali cellulose crumbs before they are fed into the continuous xanthatng vessel 3. A screw conveyor 17, rotatably driven within duct 4 through drive shaft 18 is provided to regulate the entrance and discharge of alkali cellulose into the reaction vessel. The screw flights of conveyor 17 contact the inside walls of inlet duct 4 acting to seal the reaction vessel from the external atmosphere and materially inhibit the entrance of air into the vessel. Stirring members 19 are mounted on shaft 18 to agitate the alkali cellulose crumbs within hopper 16. A port 21 is provided at the bottom of hopper 16 for diffusing nitrogen into the alkali cellulose within the hopper. The nitrogen is metered into the alkali cellulose from a conventional rotometer 22 interconnected with port 21 by line 22. While only one port 21 is shown, a multiplicity may be employed circumferentially around the bottom of the hopper. The nitrogen metered into the alkali cellulose in the hopper diffuses upwardly displacing air entrained therein purging the alkali cellulose of oxygen.

The effectiveness of the system in limiting the entry of oxygen into the reaction vessel was dramatically evident when it was found that withih hours after starting this procedure, the oxygen content of the vessel atmosphere fell from 4.5% to 2% and was thereafter easily maintained at that level by continually metering nitrogen into the hopper for as long as the continuous xanthation process was carried out. Also, it was found unnecessary to meter supplementary nitrogen directly into the vessel to remove oxygen since purging the alkali cellulose in the feed hopper was sufficient by itself to control the oxygen level in the vessel. Furthermore, by being able to control the presence of oxygen at such low levels, maintenance of a 25-35% carbon disulfide and 65-75% nitrogen atmosphere within the vessel is greatly facilitated.

The following tables illustrate the reductions in oxygen level that were obtained on separate days of operation in accordance with the invention when compared to the old system of directly purging the reaction vessel with nitrogen at constant alkali cellulose feed rates.

TABLE I
DIRECT NITROGEN PURGE OF THE REACTION VESSEL

| Day No. | Average % $O_2$ in Reaction Vessel Atmosphere | $N_2$ Addition Rate to Reaction Vessel (Cubic Feet Per Minute) |
|---|---|---|
| 1 | 4.4 | 2.0+ |
| 2 | 4.2 | 2.0+ |
| 3 | 4.0 | 2.0+ |
| 4 | 4.3 | 2.0+ |
| 5 | 4.0 | 2.0+ |

TABLE II
NITROGEN PURGE OF ALKALI CELLULOSE IN FEED HOPPER

| Day No. | Average % $O_2$ in Reaction Vessel Atmosphere | $N_2$ Addition Rate into Hopper (Cubic Feet Per Minute) |
|---|---|---|
| 1 | 2.0 | 1.5 - 1.9 |
| 2 | 2.0 | 1.5 - 1.9 |
| 3 | 1.7 | 1.5 - 1.9 |
| 4 | 2.0 | 1.5 - 1.9 |
| 5 | 2.9 | 1.5 - 1.9 |
| 6 | 2.7 | 1.5 - 1.9 |
| 7 | 2.1 | 1.5 - 1.9 |
| 8 | 1.6 | 1.5 - 1.9 |
| 9 | 1.2 | 1.5 - 1.9 |
| 10 | 2.4 | 1.5 - 1.9 |

As shown in the above tables, the average oxygen level in the reaction vessel using the method of the invention (Table II) is 50% lower than that achieved by the old method (Table I). Furthermore, the data show that less nitrogen is required to achieve the lower oxygen level using the new method. In addition, an unexpected side benefit from the method of this invention resulted when it was found that a significant increase in the degree of xanthation occurred, as determined by the fact that the filterability of the viscose more than doubled after implementation of the method.

Although the present invention has been described in conjunction with the preferred embodiments, the examples and description are only illustrative and it is to be understood that many variations and modifications may be resorted to without departing from the spirit and scope of the invention, as those skilled in the art will readily understand.

What is claimed is:

1. A continuous process for xanthating and dissolving alkali cellulose in a single chamber under an atmosphere containing less than 3% oxygen comprising continuously feeding crumbs of alkali cellulose into a closed reaction chamber where it is continuously contacted with carbon disulfide, continuously diffusing nitrogen upwardly into said alkali cellulose as it enters said chamber to displace any air entrained in said alkali cellulose with nitrogen prior to its entering said chamber, maintaining said alkali cellulose free of ambient air after diffusing nitrogen therethrough, holding said alkali cellulose within said reaction chamber for a period of time sufficient to complete the reaction thereof with carbon disulfide and convert said alkali cellulose to cellulose xanthate, dissolving said cellulose xanthate within said chamber in an aqueous solution, and continuously removing said dissolved cellulose xanthate from said reaction chamber while maintaining the atmosphere in said chamber at less than 3% oxygen solely by said continuous purging of the alkali cellulose with nitrogen as it is fed into said chamber.

* * * * *